United States Patent Office 3,351,578
Patented Nov. 7, 1967

3,351,578
MONOAZO DYESTUFFS HAVING A MONOCHLO-ROTRIAZINE RING CARRYING A SULFOAN-THRANILIC ACID AMINO SUBSTITUENT
Herbert Francis Andrew and Donald Buckley, Manchester, England, assignors to Imperial Chemical Industries Limited, London, England, a corporation of Great Britain
No Drawing. Filed Sept. 24, 1964, Ser. No. 399,094
Claims priority, application Great Britain, Nov. 23, 1960, 40,278/60
3 Claims. (Cl. 260—153)

This application is a continuation-in-part of application Ser. No. 148,752, filed Oct. 30, 1961, now abandoned, the disclosures of which are incorporated herein.

This invention relates to new monoazo compounds and more particularly it relates to new monoazo compounds obtained from cyanuric halides which compounds are valuable as "reactive" dyestuffs for cellulose.

For a reactive dye to have satisfactory printing properties, it is not only necessary that under the chosen fixation conditions good fixation of dye occurs and that fixed dye has satisfactory wet and light fastness. It is further necessary that unfixed dye can be removed by the conventional washing processes without staining of the unprinted, i.e. white portions of the print.

It is also desirable that print pastes for medium to strong shades retain their printing properties for several weeks. This arises from the print works practice of making up strong print pastes and keeping these as stock pastes. Individual print pastes are then prepared by mixing the strong print pastes of several dyes and a paste containing all normal ingredients except dye in order to obtain any desired shade. In addition it is desirable for economic reasons that unused print paste is retained after printing for re-use at an appropriate opportunity. The unused print paste arises from two sources, (a) that left in the colour box at the end of a printing run (2-3 gallons per colour) and (b) excess quantities of print paste prepared and not required on completion of a run (this may be up to 3 gallons per colour).

In order to meet these requirements it is necessary for the print paste not to deteriorate chemically (through the loss of the reactive group by hydrolysis) or physically (through precipitation or aggregation of the dye) when print pastes are stored for several weeks.

In United States Patent No. 2,979,498, there are described the monoazo dyestuffs which, in their free acid form, are represented by the formula:

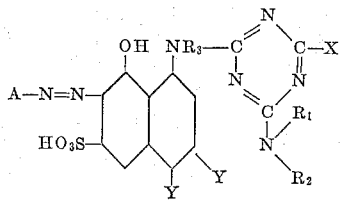

wherein A stands for a radical of the benzene series free from hydroxyl, amino or monoalkylamino groups, X stands for a halogen atom, $R_1$ stands for a hydrogen atom, or an alkyl or aryl radical free from metallisable systems, $R_2$ and $R_3$ may be the same or different and each stands for a hydrogen atom or an alkyl radical, A and $R_1$ are different being so chosen that one or both contains at least one sulphonic acid group, and one Y stands for a sulphonic acid group and the other stands for a hydrogen atom.

These dyestuffs are stated to have excellent stability in printing pastes and to give coloured textile materials having very good stability to storage in humid acid atmospheres. However, on investigation into the detailed properties of the dyestuffs particularly described in Patent No. 2,979,498, it is found that the stability in printing pastes in only excellent in respect of chemical deterioration, the physical stability leaving much to be desired.

It has now been found that, in addition to the excellent chemical stability and other desirable properties exhibited by the dyestuffs disclosed in Patent No. 2,979,498, the dyestuffs of the chemical structure defined below have good physical stability in printing pastes so that printing pastes for medium to strong shades retain their printing properties for several weeks.

According to the present invention there are provided the monoazo compounds which, in the free acid form, are represented by the formula:

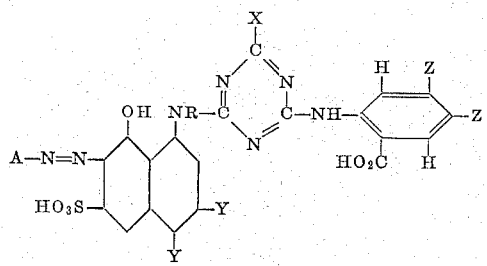

wherein A stands for an o-sulphonated phenyl radical which may contain other substituents, X stands for a halogen atom,
one Y stands for a hydrogen atom and the other for a sulphonic acid group,
one Z stands for a sulphonic acid group, and the other for a hydrogen atom, and
R stands for a hydrogen atom or an alkyl group of low molecular weight.

As examples of other substituents which may be present in the phenyl radical represented by A there may be mentioned for example, chlorine atoms and methyl, methoxy, carboxy and sulphonic acid groups.

As examples of halogen atoms represented by X there may be mentioned, for example, bromine and, preferably, chlorine.

As examples of alkyl groups of low molecular weight represented by R, there may be mentioned, for example, alkyl groups containing up to 4 carbon atoms, such as methyl, ethyl, propyl and butyl.

The new monoazo compounds may be obtained by general methods known from the literature or used in practice, by replacing one of the halogen atoms of a cyanuric halide by a radical of the formula:

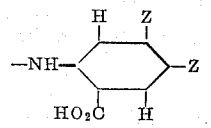

where one Z stands for a sulphonic acid group and the other for a hydrogen atom, and a second halogen atom by a radical of the formula:

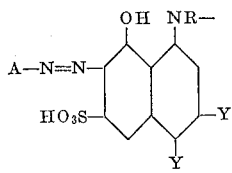

wherein A stands for an o-sulphonated phenyl radical which may contain other substituents, one Y stands for a hydrogen atom and the other for a sulphonic acid group, and R stands for a hydrogen atom or an alkyl group of low molecular weight, under conditions such that the third halogen atom is substantially unreacted.

The starting materials used to manufacture the new monoazo compounds comprise about equimolecular proportions of a cyanuric halide such as cyanuric bromide or, preferably, cyanuric chloride, an anthranilic acid containing sulphonic acid group, an orthanilic acid which may be substituted in the phenyl nucleus, and an aminonaphthol of the formula:

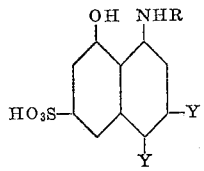

wherein R stands for a hydrogen atom or an alkyl group of low molecular weight, and one Y stands for a hydrogen atom and the other for a sulphonic acid group.

As examples of anthranilic acids which may be used, there may be mentioned for example, 4 - sulpho - 2 - aminobenzoic acid and 5 - sulpho - 2 - aminobenzoic acid.

As examples of orthanilic acids which may be used, there may be mentioned for example, orthanilic acid itself and also 4 - methyl - 2 - sulphoaniline, 3 - chloro - 4 - methyl - 6 - sulphoaniline, 4 - carboxy - 2 - sulphoaniline, 3 - chloro - 4 - carboxy - 6 - sulphoaniline, 2:5- and 2:4- disulphoanilines and 4 - amino - 3 - sulphoanisole.

As examples of aminonaphthols of the above formula which may be used, there may be mentioned 1 - amino - 8 - naphthol - 3,6 - disulphonic acid, 1 - amino - 8 - naphthol - 4:6 - disulphonic acid and 1 - N - butylamino - 8 - naphthol - 3:6 - disulphonic acid.

These starting materials may be reacted together in a number of ways, in order to obtain the new compounds. Thus a diazonium compound obtained from the orthanilic acid may be coupled with the aminonaphthol, and the cyanuric halide reacted in either order with the monoazo compound so obtained and with the anthranilic acid. Alternatively, the cyanuric halide may be reacted in either order with both the aminonaphthol and the anthranilic acid, the product so obtained then being coupled with a diazonium compound obtained from the orthanilic acid. In yet a different sequence of steps, the cyanuric halide is first reacted with the aminonaphthol, the product so obtained is coupled with the diazonium compound and then the dihalogeno-triazinylamino azo compound so obtained is condensed with the anthranilic acid.

In the above process the various steps may be carried out, if desired, in a single vessel without isolation of intermediate products. An aqueous medium is preferably used, but some care is necessary to avoid hydrolysis of the halogen atoms attached to the triazine nucleus in the cyanuric halide, various intermediate products and final dyestuff. The reaction step in which the first halogen atom of the cyanuric halide is replaced is preferably carried out below 5° C. but a higher temperature may be necessary. In general, a higher temperature is used for the step in which the second halogen atom of the cyanuric halide is replaced, than for the first. Where the coupling component used in a coupling step contains a triazine nucleus, the coupling is preferably carried out at as low a pH as will give efficient coupling ortho to the hydroxyl group of the naphthalene nucleus.

The product so obtained may be isolated by customary techniques for the isolation of water soluble dyestuffs, for example by spray-drying or by precipitating the compound in the form of its sodium salt by adding sodium chloride to the reaction medium and filtering off and drying the resulting precipitate.

The new monoazo compounds are especially valuable as "reactive" dyestuffs for cellulose textile materials which they colour in red shades of good fastness to washing and to light when applied in conjunction with an alkali, for example by the methods described and claimed in U.S. Patent No. 2,892,671. The new monoazo compounds may also be used to colour natural proteins such as wool, silk and leather and synthetic polyamide and polyacrylonitrile textile materials in red shades having a high fastness to washing. The colouration of these materials may be carried out by treatment with an acid, neutral or weakly alkaline solution of the dyestuff, and if desired, the pH of the dyebath may be varied during dyeing for example from a low pH to a higher pH or vice-versa.

The invention is illustrated but not limited by the following examples in which parts and percentages are by weight:

Example 1

A solution of 20.4 parts of cyanuric chloride in 100 parts of acetone is poured into a stirred mixture of 150 parts of water and 150 parts of crushed ice at 0–3° C. Into the suspension of cyanuric chloride so obtained there is slowly added a solution of 56.9 parts of the trisodium salt of 1 - amino - 3:6 - disulpho - 7 - (2' - sulphophenylazo) - 8 - naphthol dissolved in 600 parts of water at pH 7.0. The mixture is stirred for 3 hours, 55 parts of 2 N sodium carbonate solution being added to maintain the pH at 7.0 and the temperature being maintained at 0–3° C. by external cooling.

A solution of 23.9 parts of 2 - amino - 5 - sulphobenzoic acid dissolved in 100 parts of water at pH 7.0 is added and the mixture is stirred at 38 to 42° C. for 3 hours, about 50 parts of 2 N sodium carbonate solution being added to maintain the pH at 7.0. The solution is cooled to 10–15° C. and the dyestuff isolated by adding sodium chloride and potassium acetate to give concentrations of approximately 100 g. per litre and 200 g. per litre respectively and filtering off.

The dyestuff contains one atom of hydrolysable chlorine per molecule and yields bright red dyeings and prints on cellulosic materials with very good light and washing fastness.

If in place of 2 - amino - 5 - sulphobenzoic acid, there is used 2 - amino - 4 - sulphobenzoic acid in the above example a similar red dyestuff is obtained.

Example 2

If in Example 1 there are used 34.9 parts of cyanuric bromide in place of the cyanuric chloride there is obtained a similar red dyestuff which when applied to cellulosic textile materials in conjunction with an acid binding agent yields bright red dyeings and prints with very good light and washing fastness.

The following table describes the shades obtained from further examples of dyestuffs of the invention obtained by the general method described in Example 1, i.e. by coupling a diazo salt of the amine named in the first column with the aminonaphthol named in the second column, condensing the resulting aminoazo compound with cyanuric chloride and condensing further with one molecular proportion of the amine named in the third column:

coupling a diazo salt of the amine named in the first column with the N-dichloro-s-triazinyl derivative of the

| Example | Diazo Component | Aminonaphthol | Amine | Shade |
|---|---|---|---|---|
| 3 | Orthanilic acid | 1-amino-8-naphthol-4:6-disulphonic acid. | 2-amino-5-sulpho-benzoic acid. | Red. |
| 4 | do | do | 2-amino-4-sulphobenzoic acid. | Do. |
| 5 | do | 1-(N-ethylamino)-8-naphthol-3:6-disulphonic acid. | 2-amino-5-sulphobenzoic acid. | Yellowish-red. |
| 6 | do | 1-(N-n-butylamino)-8-naphthol-3:6-disulphonic acid. | do | Do. |

Example 7

To a cyanuric chloride suspension formed as described in Example 1 and maintained at a temperature between aminonaphthol named in the second column and condensing the product so obtained with one molecular proportion of the amine named in the third column.

| Example | Diazo Component | Aminonaphthol | Amine | Shade |
|---|---|---|---|---|
| 8 | Anilino-2:5-disulphonic acid. | 1-amino-8-naphthol-3:6-disulphonic acid. | 2-amino-8-sulpho-benzoic acid. | Red. |
| 9 | 4-nitroanilino-2-sulphonic acid. | do | do | Red. |
| 10 | 4-methylaniline-2-sulphonic acid. | do | do | Red. |
| 11 | 4-chloro-5-methylaniline-2-sulphonic acid. | do | do | Red. |
| 12 | 5-chloro-4-methylaniline-2-sulphonic acid. | do | do | Red. |
| 13 | 4-methoxyaniline-2-sulphonic acid. | do | do | Red. |

0 and 5° C. there is added during 20 minutes a neutral solution of 40 parts of the disodium salt of 1 - amino-8 - naphthol - 3:6 - disulphonic acid dissolved in 200 parts of water. The mixture is stirred at 0–5° C. until no unchanged 1 - amino - 8 - naphthol - 3:6 - disulphonic acid remains in the solution. Aqueous 2 N sodium carbonate is added during this period to maintain the pH at 7.0.

A suspension of the diazo compound from 25.3 parts of aniline-2:4-disulphonic acid obtained by diazotising a mixture of aniline-2:4-disulphonic acid in 200 parts of water and 22 parts of hydrochloric acid (density=1.18) at a temperature between 0 and 2° C. with 6.9 parts of sodium nitrite, is added to the mixture during 5 minutes while the temperature is maintained between 0 and 5° C. 40 parts of sodium acetate crystals are then added during 10 minutes to the mixture which is stirred at a temperature between 0 and 5° C. for 16–20 hours. Anhydrous sodium carbonate is gradually added until the pH of the mixture is 7.0 and sodium chloride is then added to give a concentration of 200 g. litre and the mixture is stirred for 30 minutes and filtered. The resulting dyestuff is washed with acetone and dried.

40.9 parts of the tetrasodium salt of the product obtained are dissolved in 600 parts of the water. A solution of 10.9 parts of 2-amino-5-sulphobenzoic acid in 100 parts of water at pH 7.0 is added and the mixture stirred at a temperature between 35° and 40° C.

Aqueous 2 N sodium carbonate solution is added to maintain the pH at 7.0 and stirring is continued at a temperature between 35 and 40° C. for two hours. Sodium chloride is added to give a concentration of 100 g. per litre and the precipitated dyestuff is filtered off and dried at 50° C.

When applied to cellulosic textile materials in conjunction with a treatment with an acid binding agent the dyestuff yields bright red dyeings and prints with very good light and washing fastness.

The following table describes the shades obtained from further examples of dyestuffs of the invention obtained by the general method described in Example 7, i.e. by

Example 14

To the solution of the N-dichloro-s-triazinyl derivative of 1-amino-8-naphthol-3:6-disulphonic acid obtained as described in Example 7 there is added during 15 minutes a solution of 21.7 parts of 2-amino-5-sulphobenzoic acid in 200 parts of water at pH 7.0. The mixture is stirred at a temperature between 30 and 35° C. Aqueous 2 N sodium carbonate solution is added to maintain the pH at 7.0 and stirring is continued at a temperature between 30 and 35° C. for about 2 hours or until the pH is constant at 7.0. The solution is cooled to a temperature between 5 and 10° C. and 40 parts of sodium acetate crystals are added.

A suspension of the diazo compound from 25.3 parts of aniline-2:4-disulphonic acid obtained as described in Example 7 is added to the mixture during 5 minutes while the temperature is maintained at between 0 and 5° C. 40 parts of sodium acetate crystals are then added during 10 minutes to the mixture which is stirred at a temperature between 0 and 5° C. for 16 hours. Sodium chloride is added to give a concentration of 100 g. per litre and the precipitated dyestuff is filtered and dried. The dyestuff is identical with the dyestuff prepared as described in Example 7 and has similar dyeing properties.

The essential integer of novelty in the new dyestuffs, as compared with those described in Patent No. 2,979,498, lies in the choice of a sulpho-anthranilic acid radical attached through its amino group to the triazine ring. Patent No. 2,979,498 in fact discloses the use of sulpho-anthranilic acid as a suitable diazo-component i.e. leading to the production of a dye having a sulpho-o-carboxyphenyl group attached to the azo group and an anilino group on the triazine nucleus. This dyestuff does not have the desirable physical stability in printing pastes exhibited by the new dyestuffs, nor according to our researches does the corresponding dyestuff having a sulphoanilino group on the triazine ring. Since the latter dyestuff is an isomer of those described in Examples 1, 4 and 5 of the present specification, it is believed that the valuable effect obtained is not merely due to increasing the number of solubilising groups in the molecule but is specific to the structure indicated.

We claim:
1. The monoazo compounds which, in the free acid form, are represented by the formula:

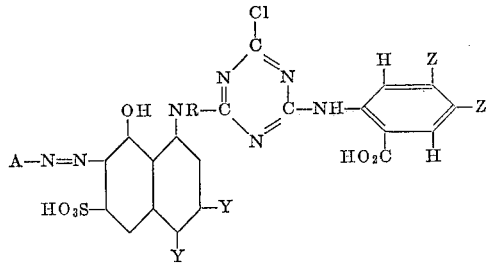

wherein:
A stands for an o-sulfonated phenyl radical on which any substituents are selected from the group consisting of —SO₃H, —NO₂, —CH₃, —Cl, and —OCH₃;
one Y stands for a hydrogen atom and the other for a sulfonic acid group;
one Z stands for a member selected from the group consisting of —CO₂H and —SO₃H, and the other for a hydrogen atom; and
R stands for a member selected from the group consisting of hydrogen and a lower alkyl group.

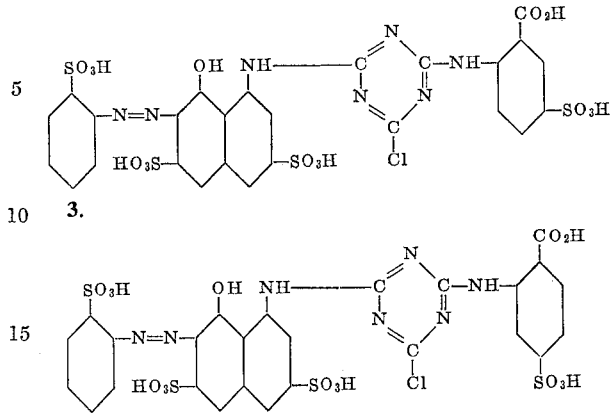

References Cited
UNITED STATES PATENTS

| | | | |
|---|---|---|---|
| 2,873,269 | 2/1959 | Fasciati et al. | 260—153 |
| 2,931,794 | 4/1960 | Ruetimeyer et al. | 260—153 X |
| 2,945,021 | 7/1960 | Fasciati et al. | 260—153 |
| 2,979,498 | 4/1961 | Andrew et al. | 260—153 |

CHARLES B. PARKER, *Primary Examiner.*

D. PAPUGA, *Assistant Examiner.*